US 12,119,480 B2

(12) United States Patent
Ryu et al.

(10) Patent No.: US 12,119,480 B2
(45) Date of Patent: Oct. 15, 2024

(54) METHOD FOR MANUFACTURING SECONDARY BATTERY WITH IMPROVED RESISTANCE

(71) Applicant: LG Chem, Ltd., Seoul (KR)

(72) Inventors: Ji Hoon Ryu, Daejeon (KR); Song Yi Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 594 days.

(21) Appl. No.: 17/296,718

(22) PCT Filed: Sep. 16, 2020

(86) PCT No.: PCT/KR2020/095121
§ 371 (c)(1),
(2) Date: May 25, 2021

(87) PCT Pub. No.: WO2021/118330
PCT Pub. Date: Jun. 17, 2021

(65) Prior Publication Data
US 2022/0085351 A1    Mar. 17, 2022

(30) Foreign Application Priority Data

Dec. 9, 2019 (KR) .......................... 10-2019-0162484

(51) Int. Cl.
*H01M 4/139* (2010.01)
*H01M 10/0525* (2010.01)
*H01M 10/0585* (2010.01)

(52) U.S. Cl.
CPC ....... *H01M 4/139* (2013.01); *H01M 10/0525* (2013.01); *H01M 10/0585* (2013.01); *Y10T 29/49108* (2015.01)

(58) Field of Classification Search
CPC ........... H01M 4/139; H01M 2004/028; H01M 2004/027; H01M 4/043; H01M 10/058; Y10T 29/49108
(Continued)

(56) References Cited

U.S. PATENT DOCUMENTS 10,050,305 B2 *   8/2018   Kim .................... H01M 10/052
2005/0238957 A1  10/2005   Kim et al.
(Continued)

FOREIGN PATENT DOCUMENTS

CN        1910772 A    2/2007
CN      102386364 A    3/2012
(Continued)

OTHER PUBLICATIONS

Search Report for European Application No. 20888726.5 dated Feb. 11, 2022. 1 pg.
(Continued)

*Primary Examiner* — Thiem D Phan
(74) *Attorney, Agent, or Firm* — Lerner David LLP

(57) ABSTRACT

The present invention relates to a method of manufacturing a secondary battery with improved resistance. According to the present invention, since the electrode assembly with succinonitrile interposed at the interface between the electrode and the separator is manufactured and then laminated, a high-pressure process is not required during lamination compared to the prior art, thereby improving processability, and since succinonitrile is dissolved in the electrolyte solution, it exhibits an effect of improving the resistance of the battery.

12 Claims, 2 Drawing Sheets

(58) Field of Classification Search
USPC .................................. 29/623.1, 623.4, 623.5
See application file for complete search history.

(56) References Cited

U.S. PATENT DOCUMENTS

| | | |
|---|---|---|
| 2012/0052372 A1 | 3/2012 | Ahn |
| 2012/0225351 A1 | 9/2012 | Kojima |
| 2012/0288746 A1 | 11/2012 | Abe et al. |
| 2013/0122364 A1 | 5/2013 | Kim et al. |
| 2013/0280608 A1 | 10/2013 | Kim et al. |
| 2013/0288119 A1 | 10/2013 | Kim et al. |
| 2014/0242470 A1 | 8/2014 | Ogata |
| 2014/0272505 A1 | 9/2014 | Yoon et al. |
| 2015/0155538 A1* | 6/2015 | Tang .................. H01M 50/434 |
| | | 429/188 |
| 2016/0336625 A1 | 11/2016 | Jeong et al. |
| 2017/0149039 A1 | 5/2017 | Shon et al. |
| 2018/0123169 A1 | 5/2018 | Solan et al. |

FOREIGN PATENT DOCUMENTS

| | | |
|---|---|---|
| CN | 103571420 A | 2/2014 |
| CN | 104051776 A | 9/2014 |
| EP | 2528133 A1 | 11/2012 |
| EP | 2924781 A1 | 9/2015 |
| EP | 3147966 A1 | 3/2017 |
| JP | 2015002080 A | 1/2015 |
| JP | 2015144108 A | 8/2015 |
| JP | 2018525774 A | 9/2018 |
| KR | 20000042976 A | 7/2000 |
| KR | 20060045320 A | 5/2006 |
| KR | 20110085374 A | 7/2011 |
| KR | 101093707 B1 | 12/2011 |
| KR | 20120128626 A | 11/2012 |
| KR | 20130123744 A | 11/2013 |
| KR | 20140008982 A | 1/2014 |
| KR | 20140026009 A | 3/2014 |
| KR | 20140062761 A | 5/2014 |
| KR | 20140069202 A | 6/2014 |
| KR | 20140113186 A | 9/2014 |
| KR | 101457544 B1 | 11/2014 |
| KR | 20150059577 A | 6/2015 |
| KR | 20170022042 A | 3/2017 |
| KR | 20170134156 A | 12/2017 |
| KR | 20190019026 A | 2/2019 |

OTHER PUBLICATIONS

International Search Report for Application No. PCT/KR2020/095121, mailing dated Jan. 8, 2021, 3 pages.

* cited by examiner

[FIG. 1]
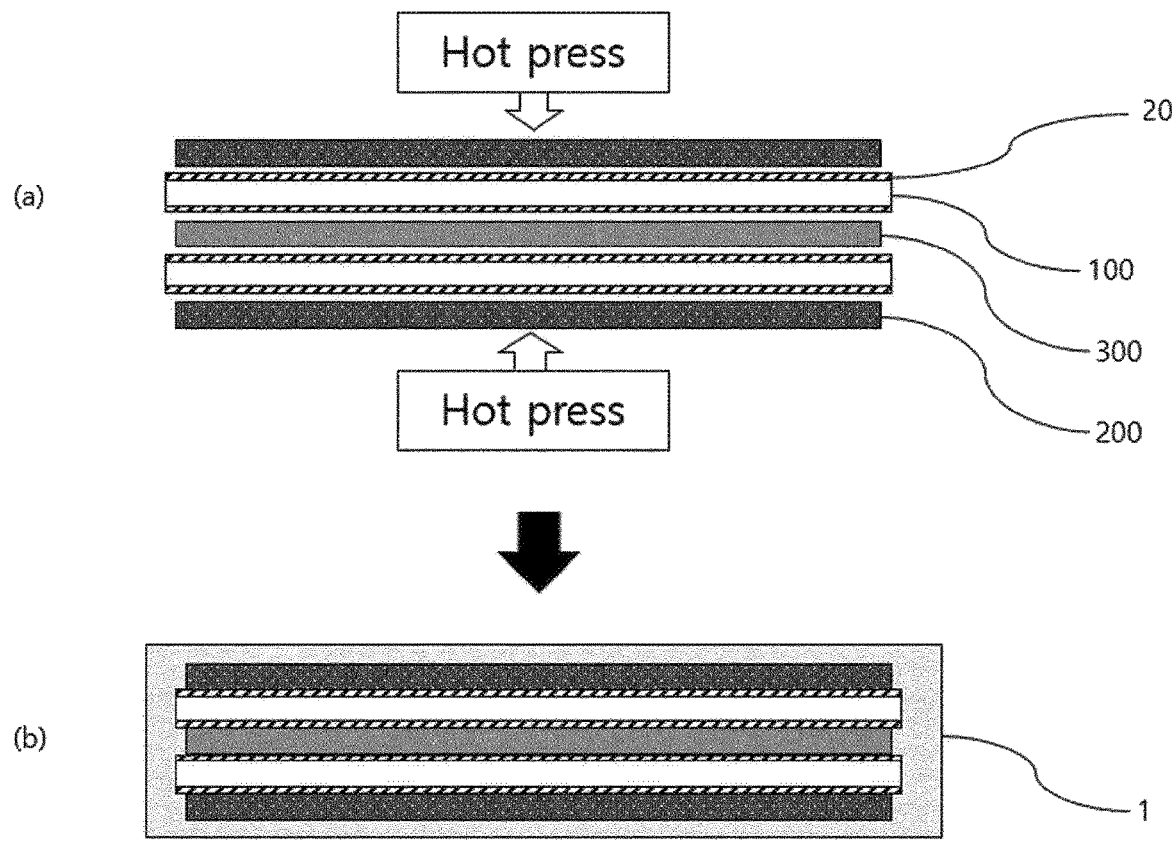

[FIG. 2]
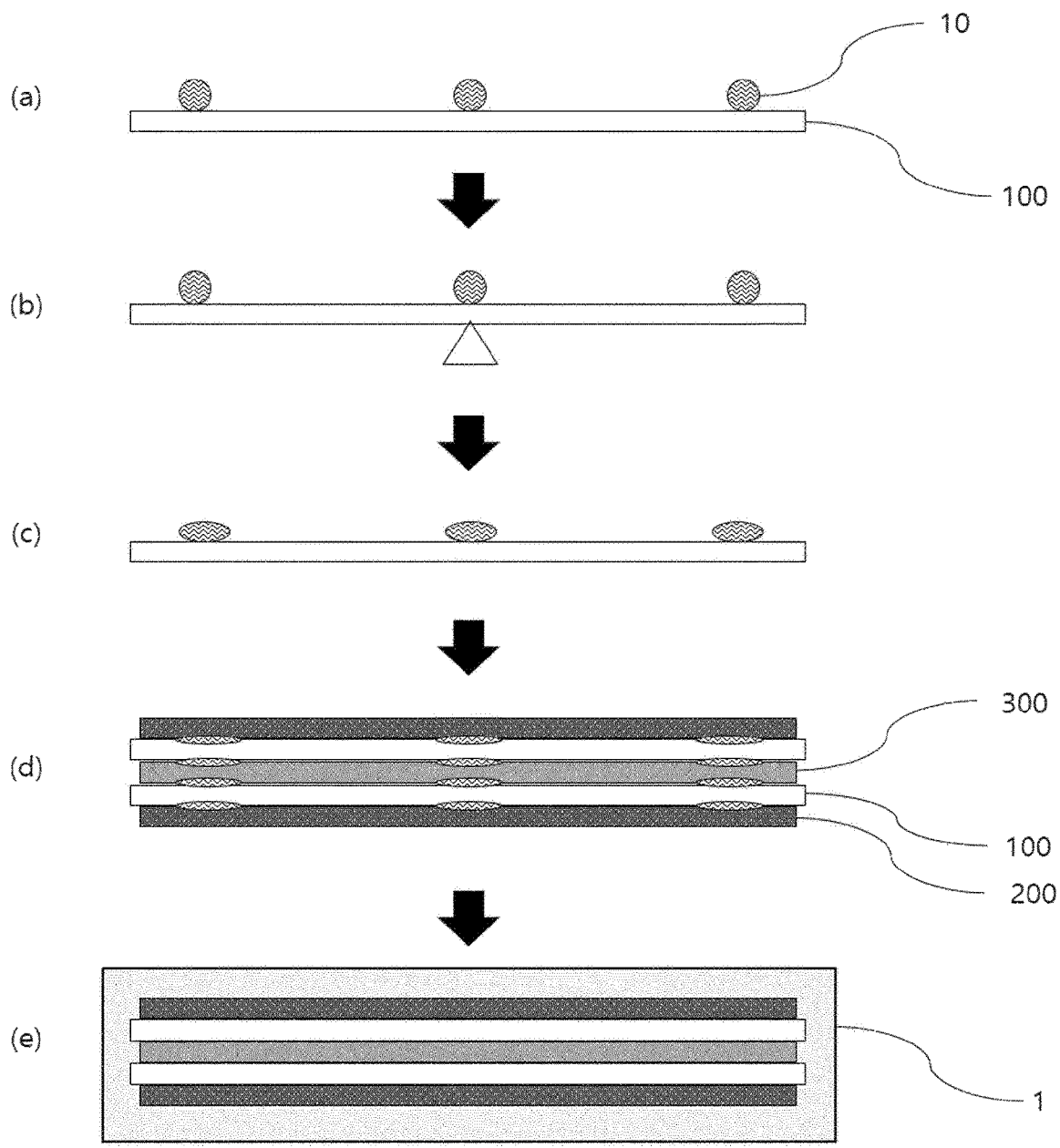

METHOD FOR MANUFACTURING SECONDARY BATTERY WITH IMPROVED RESISTANCE

CROSS-REFERENCE TO RELATED APPLICATIONS

The present application is a national phase entry under 35 U.S.C. § 371 of International Application No. PCT/KR2020/095121, filed on Sep. 16, 2020, which claims priority to Korean Patent Application No. 10-2019-0162484, filed on Dec. 9, 2019, the disclosures of which are incorporated herein by reference in their entirety.

TECHNICAL FIELD

The present invention relates to a method of manufacturing a secondary battery in which resistance is improved by applying succinonitrile to an interface between an electrode and a separator when manufacturing a lithium secondary battery.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

Secondary batteries are classified into coin-type batteries, cylindrical batteries, prismatic batteries, and pouch-type batteries according to the shape of the battery case. In a secondary battery, an electrode assembly mounted inside a battery case is a power generating element capable of charging and discharging having a stacked structure of electrodes and separators.

The electrode assembly may be classified into a jellyroll type which is wound with a separator interposed between sheet-type positive electrode and negative electrode coated with the active material, a stack type in which multiple positive electrodes and negative electrodes are sequentially stacked with a separator interposed therebetween, and a stack/folding type in which stack-type unit cells are wound with a long separation film.

Among them, in the case of a battery having a stack type or a stack/folding type structure, a lamination process of bonding an electrode and a separator during battery manufacturing is essential. The lamination process is a process of attaching an electrode and a separator, and if the electrode and the separator fall apart, the yield and processability are very poor when assembling the battery. In addition, it is impossible to assemble a stacked or stacked/folded battery without a lamination process.

Conventionally, for the lamination process, a binder layer was formed on the surface of the separator, and thereafter, the electrode and the separator were bonded under high temperature and high pressure conditions. However, during this process, damage to the separator occurs, and the binder used as an adhesive remains melted and acts as a resistance in the battery, thereby deteriorating battery performance.

DISCLOSURE

Technical Problem

The present invention is invented to solve the above problems, and relates to a method for manufacturing a secondary battery that minimizes damage to a separator and improves resistance in the battery because there is no residual binder.

Technical Solution

The method for manufacturing a secondary battery with improved resistance according to the present invention includes:
a step of preparing an electrode assembly in which succinonitrile is interposed at an interface between an electrode and a separator; a lamination step of heating and pressing the prepared electrode assembly; and a step of accommodating the laminated electrode assembly in a battery case and injecting an electrolyte solution. In one example, in the step of manufacturing the electrode assembly, the succinonitrile includes one partially interposed at the interface between the electrode and the separator.

In a specific example, in the step of preparing the electrode assembly, an area to which succinonitrile is applied is in a range of 1 to 30% of a total area of a portion where the electrode and the separator are laminated.

In one example, the step of preparing the electrode assembly includes dropping succinonitrile on a surface of either electrode or separator.

In a specific example, the step of preparing the electrode assembly includes: dropping liquid succinonitrile on one or both sides of the separator; cooling the succinonitrile to room temperature; and laminating the electrode on the separator with the succinonitrile interposed therebetween.

In another specific example, the step of preparing the electrode assembly includes: dropping liquid succinonitrile on one or both sides of the electrode; cooling the succinonitrile to room temperature; and laminating a separator on the electrode with succinonitrile interposed therebetween.

In another example, the step of preparing the electrode assembly includes applying succinonitrile in a wax phase to a surface of any one of the electrode and the separator.

In a specific example, the step of preparing the electrode assembly includes: positioning succinonitrile in a wax phase on one or both sides of the separator; heating the succinonitrile to a temperature equal to or higher than its melting point and cooling the succinonitrile to a room temperature; and laminating the electrode on the separator with the succinonitrile interposed therebetween.

In another specific example, the step of preparing the electrode assembly includes: positioning succinonitrile in a wax phase on one or both sides of the electrode; heating the succinonitrile to a temperature equal to or higher than its melting point and cooling the succinonitrile to a room temperature; and laminating a separator on the electrode with succinonitrile interposed therebetween.

In one example, the lamination step is performed by pressing the electrode assembly at a temperature of 57° C. or higher.

In further another example, the lamination step is performed by pressing the electrode assembly at a pressure of 30 kgf/cm or less.

In one example, at the step of injecting the electrolyte solution or after the step of injecting the electrolyte solution, the succinonitrile is dissolved in the electrolyte solution.

Advantageous Effects

Since the method for manufacturing a secondary battery according to the present invention does not require a high-pressure process as in the prior art during the lamination process, damage to the separator can be minimized and process cost can be reduced. In addition, since the succinonitrile is dissolved in the electrolyte solution between the electrode and the separator, there is an advantage of lowering the resistance of the battery.

BRIEF DESCRIPTION OF THE DRAWINGS

FIG. 1 shows a method of manufacturing a battery according to a comparative example.

FIG. 2 shows a method of manufacturing a battery according to an embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

FIG. 1 relates to a conventional method for manufacturing a secondary battery, and
conventionally, a binder coating layer 20 was provided on both sides of a separator 100 in a battery. The first electrode 200 and the second electrode 300 were alternately disposed on each side of the binder coating layer 20 to thereby manufacture an electrode assembly. Thereafter, a lamination process was performed on both sides of the stacked electrode assembly under conditions of high temperature/high pressure as shown in FIG. 1A. Thereafter, as shown in FIG. 1B, the electrode assembly was accommodated in a battery case, and an electrolyte solution was injected to manufacture a secondary battery 1.

In the conventional method as described above, the binder coating layer 20 was used to increase the adhesive force between the separator 100 and electrodes 200 and 300, but in the manufacture of the secondary battery 1, since the binder coating layer 20 still remains as an element, there is a problem of deteriorating the performance of the battery by acting as an internal resistance.

The present invention relates to a method of manufacturing a secondary battery having improved resistance in order to solve the above problems.

In one example, a method for manufacturing a secondary battery according to the present invention includes:
a step of preparing an electrode assembly in which succinonitrile is interposed at an interface between an electrode and a separator; a lamination step of heating and pressing the prepared electrode assembly; and a step of accommodating the laminated electrode assembly in a battery case and injecting an electrolyte solution. In one example, in the step of manufacturing the electrode assembly, the succinonitrile includes one partially interposed at the interface between the electrode and the separator.

First, succinonitrile (SN) will be described. Succinonitrile is a material mainly used as an electrolyte additive for lithium secondary batteries. Succinonitrile does not interfere with the formation of the SEI (Solid Electrolyte Interface) film of the negative electrode, and does not change the cycle life and capacity of the battery. Since succinonitrile is used as an additive in the electrolyte, it dissolves immediately upon contact with the solvent of the electrolyte.

In addition, succinonitrile exists in the state of a very viscous wax at room temperature, and its melting point is 57° C., so the succinonitrile is present in a liquid state under higher temperature conditions. Therefore, succinonitrile is converted into a wax form when cooled to room temperature after liquefaction, and can serve as an adhesive.

That is, in the present invention, a solid succinonitrile in a wax form at room temperature is used as a binder to bond the electrode and the separator. In addition, in the present invention, after interposing the succinonitrile having the above-described characteristics between the separator and the electrode, an electrode assembly such as a stack type or a stack/folding type is manufactured. In addition, after the lamination process, the electrolyte solution is injected to dissolve the succinonitrile, so that no resistor is present on the interface between the separator and the electrode.

FIG. 2 is a schematic view showing a method of manufacturing a secondary battery according to an embodiment of the present invention, According to an embodiment of the present invention, first, in FIG. 2A, the succinonitrile 10 is positioned on one surface of the separator 100. Thereafter, as shown in FIG. 2B, the separator is heated to liquefy the succinonitrile, and then cooled at room temperature as shown in FIG. 2C. In this case, as shown in FIG. 2D, the first electrode 200 and the second electrode 300 are alternately stacked on one surface of the separator on which the succinonitrile is located to thereby manufacture an electrode assembly. Thereafter, as shown in FIG. 2E, the secondary battery 1 is manufactured by accommodating the electrode assembly in a battery case and injecting an electrolyte solution.

The first electrode may be a positive electrode or a negative electrode, and the second electrode may be a negative electrode or a positive electrode.

Specific details related to this will be described below.

First, in order to position the succinonitrile between the electrode and the separator of the present invention, it is possible to use a liquid or solid succinonitrile.

First, one method is to use liquid succinonitrile.

In one example, the step of manufacturing the electrode assembly includes dropping liquid succinonitrile on the surface of any one of the electrode and the separator.

In a preferred example, the step of preparing the electrode assembly includes: dropping liquid succinonitrile on one or both sides of the separator; cooling the succinonitrile to room temperature; and laminating the electrode on the separator with the succinonitrile interposed therebetween.

In another preferred example, the step of preparing the electrode assembly includes: dropping liquid succinonitrile on one or both sides of the electrode; cooling the succinonitrile to room temperature; and laminating a separator on the electrode with succinonitrile interposed therebetween.

In order to drip the liquid succinonitrile as described above, the solid succinonitrile is heated to a temperature above the melting point, and used. Liquid succinonitrile solidifies within a few seconds. At this time, since the solidification proceeds in the form of a highly viscous wax, if the electrode and the separator are directly bonded together, strong adhesion can be achieved.

Another method is a method using solid succinonitrile.

In one example, the step of manufacturing the electrode assembly includes directly applying succinonitrile in wax form to the surface of any one of the electrode and the separator.

In a preferred example, the step of preparing the electrode assembly includes: positioning succinonitrile in a wax phase on one or both sides of the separator; heating the succinonitrile to a temperature equal to or higher than its melting point and cooling the succinonitrile to a room temperature; and laminating the electrode on the separator with the succinonitrile interposed therebetween.

In another preferred example, the step of preparing the electrode assembly includes: positioning succinonitrile in a wax phase on one or both sides of the electrode; heating the succinonitrile to a temperature equal to or higher than its melting point and cooling the succinonitrile to a room temperature; and laminating a separator on the electrode with succinonitrile interposed therebetween.

After placing the solid succinonitrile on the electrode or separator as described above, the electrode or separator is heated to 57° C. or higher to liquefy the succinonitrile, and then, when the solidification proceeds by cooling at room temperature, the electrode and the separator are laminated and adhered.

In the step of manufacturing the electrode assembly of the present invention, the area to which succinonitrile is applied is in the range of 1% to 30%, preferably in the range of 1 to 20% or 5 to 10% of the total area of the electrode and the separator. If the area occupied by succinonitrile is less than 1%, the adhesive force between the electrode and the separator may decrease, which may cause detachment between the electrode and the separator during the lamination process, and If the area is more than 30%, the succinonitrile content in the electrolyte solution may be so high that the overall performance of the electrolyte solution may be changed. In addition, there is a problem that a part of the succinonitrile may not dissolve in the electrolyte solution and act as a resistor.

In addition, the form in which succinonitrile is applied may be patterned in a form in which dots, lines, or surfaces are combined, and may be applied along the edge portion or applied only to the edge.

After performing the step of manufacturing the electrode assembly as described above, a lamination step of heating and pressing the manufactured electrode assembly is performed.

In the conventional lamination process, a pressure of 10 to 50 kgf/cm is applied under a temperature condition of 70 to 100° C. Through this, the electrode and the separator are strongly attached, and the thickness of the separator fabric is generally reduced by about 10% through the lamination process as described above.

However, in the lamination step of the present invention, the electrode assembly in which the succinonitrile is interposed between the electrode and the separator is performed at a temperature of 57° C. or higher, preferably 60 to 70° C. Since the high temperature conditions in the conventional lamination process are not used through the above temperature conditions, not only can the process cost be reduced, but damage such as shrinkage of the separator due to high temperature can be prevented.

In another example, the lamination step is performed by pressing the electrode assembly at a pressure of 30 kgf/cm or less, preferably 1 to 10 kgf/cm, and more preferably 1 to 5 kgf/cm. According to the present invention, since the electrode and the separator are adhered using succinonitrile, a strong level of pressure is not required as in the prior art. This not only reduces the process cost, but also prevents physical damage to the separator due to high pressure.

In the lamination process, the electrode assembly to be transferred is passed between a pair of rollers and pressed to bond to each other. Specifically, in the lamination process, a heater is connected to a pair of pressing rollers to apply heat to the electrode assembly and pressurize to bond to each other.

In the present invention, lamination is performed using a pressing roller, but it is also possible to apply press lamination. In this case, it is preferable to use a pressure of $\frac{1}{10}$ to $\frac{1}{5}$ of the pressure conditions of general press lamination.

After the electrode assembly is subjected to the lamination step, the electrode assembly is accommodated in the battery case, and then an electrolyte solution is injected.

In the present invention, at the step of injecting the electrolyte or after the step, the succinonitrile is dissolved in the electrolyte solution. That is, the succinonitrile located at the interface between the electrode and the separator is dissolved in the solvent of the electrolyte solution and used as an additive, and succinonitrile does not remain at the interface between the electrode and the separator. This can improve the resistance of the battery.

In summary, the electrode assembly of the present invention may have a structure in which electrodes and separators are alternately stacked, and succinonitrile is present at each interface between the electrode and the separator.

Since succinonitrile acts as an adhesive means between the electrode and the separator, there is an advantage in that it is easy to adhere even in a lamination process of a lower temperature and pressure than the conventional one. In addition, since succinonitrile is dissolved in the electrolyte injection process, which is the rear end of the battery manufacturing process, and does not remain within the interface anymore, the resistance of the battery can be minimized, thereby exhibiting an effect of preventing performance degradation of the battery.

Meanwhile, the electrode used in the present invention is an electrode for a lithium secondary battery. The lithium secondary battery includes, for example, an electrode assembly including a positive electrode, a negative electrode, and a separator interposed between the positive electrode and the negative electrode; a non-aqueous electrolyte impregnating the electrode assembly; and a battery case containing the electrode assembly and the non-aqueous electrolyte.

The positive electrode has a structure in which a positive electrode mixture layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode mixture layer includes a conductive material and a binder polymer in addition to the positive electrode active material, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0≤y<1$), $Li_xNi_{1-y}Mn_yO_2$ ($0.5<x<1.3$, $O≤y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$). In addition, the lithium-containing transition metal oxide may be coated with a metal such as aluminum (Al) or a metal oxide. Further, in addition to the lithium-containing transition metal oxide, one or more of sulfide, selenide, and halide may be used.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof. Specifically, the current collector for the positive electrode is formed of metal components described above, and includes a metal plate having a through hole in the thickness direction, and an ion conductive porous reinforcing material filled in the through hole of the metal plate.

The negative electrode may further include a negative electrode mixture layer, and may include a carbon material, lithium metal, silicon, or tin. When a carbon material is used as the negative electrode active material, both low crystalline carbon and high crystalline carbon may be used. Representative examples of low crystalline carbon include soft carbon and hard carbon are typical. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials. Specifically, the current collector for the negative electrode is formed of metal components described above, and includes a metal plate having a through hole in the thickness direction, and an ion conductive porous reinforcing material filled in the through hole of the metal plate.

In addition, the negative electrode may include a conductive material and a binder commonly used in the art.

The separator may be made of any porous substrate used in a lithium secondary battery, and for example, a polyolefin-based porous membrane or a nonwoven fabric may be used, but the present invention is not particularly limited thereto. Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

A non-aqueous electrolyte containing a non-aqueous electrolyte solution may be used as the electrolyte solution. Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc. However, it is not particularly limited thereto, and a number of electrolyte components commonly used in the field of lithium secondary batteries may be added or subtracted within an appropriate range.

In addition, the present invention provides a vehicle or large-capacity energy storage device including the secondary battery described above. In a specific example, the vehicle is a hybrid or electric vehicle.

Hereinafter, the present invention will be described in more detail through examples. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

Examples and Comparative Examples

Preparation of Positive Electrode, Negative Electrode and Separator

As positive electrode active materials, 95% by weight of $LiCoO_2$, 2.5% by weight of carbon black (conductive agent) and 2.5% by weight of PVDF (binder) were added to a non-aqueous electrolyte solution to thereby prepare a mixture slurry, which was then applied to a current collector, dried and rolled to thereby prepare a positive electrode.

As negative electrode active materials, 95% by weight of graphite, 2.5% by weight of carbon black (conductive agent) and 2.5% by weight of PVDF (binder) were added to a non-aqueous electrolyte solution to thereby prepare a mixture slurry, which was then applied to a current collector, dried and rolled to thereby prepare a negative electrode.

The separator was made of porous polyethylene.

Preparation of Lithium Secondary Battery

Example 1

After the solid succinonitrile was heated to 60° C. to be liquefied, the liquefied succinonitrile was applied in the form of dots on both sides of the separator. At this time, the succinonitrile was applied so that the succinonitrile-applied area was 5% of the area where the separator and the electrode were to be laminated. Thereafter, succinonitrile was solidified into a wax phase at room temperature.

Then, a positive electrode was placed on one side of the separator, and a negative electrode was placed on the opposite side, and then laminated to manufacture an electrode assembly. At this time, the electrode assembly was roll-laminated at 80° C. and 5 kgf/cm.

The prepared electrode assembly was accommodated in a pouch-type battery case, and an electrolyte solution was injected to manufacture a secondary battery.

Example 2

The solid succinonitrile was heated to 60° C. to be liquefied, and then the liquefied succinonitrile was applied in the form of dots on the surfaces of the positive electrode and the negative electrode that were in contact with the separator. At this time, the succinonitrile was applied so that the succinonitrile-applied area was 10% of the area where the separator and the electrode were to be laminated. Then, succinonitrile was solidified at room temperature.

Then, a positive electrode was placed on one side of the separator, and a negative electrode was placed on the opposite side, and then laminated to manufacture an electrode assembly. At this time, the electrode assembly was laminated at 80° C. and 5 kgf/cm.

The prepared electrode assembly was accommodated in a pouch-type battery case, and an electrolyte solution was injected to manufacture a secondary battery.

Example 3

Solid succinonitrile was fixed in the form of dots on both sides of the separator so that the area of succinonitrile was 1% of the area where the separator and the electrode were to be laminated.

Thereafter, the separator was heated to 60° C. to liquefy succinonitrile. Then while cooling the succinonitrile at room temperature, positive and negative electrodes were placed on both sides of the separator, respectively, and then laminated to manufacture an electrode assembly. At this time, the electrode assembly was laminated at 80° C. and 5 kgf/cm.

The prepared electrode assembly was accommodated in a pouch-type battery case, and an electrolyte solution was injected to manufacture a secondary battery.

Example 4

The solid succinonitrile was fixed in the form of dots on the surface of the negative electrode and the positive electrode that contacted the separator so that the area of succinonitrile was 30% of the area where the separator and electrode were to be laminated.

Thereafter, the separator was heated to 60° C. to liquefy succinonitrile. Then while cooling the succinonitrile at room temperature, positive and negative electrodes were placed on both sides of the separator, respectively, and then laminated to manufacture an electrode assembly. At this time, the electrode assembly was laminated at 80° C. and 5 kgf/cm.

The prepared electrode assembly was accommodated in a pouch-type battery case, and an electrolyte solution was injected to manufacture a secondary battery.

Example 5

After the solid succinonitrile was heated to 60° C. to be liquefied, the liquefied succinonitrile was applied in the form of dots on both sides of the separator. At this time, the succinonitrile was applied so that the succinonitrile-applied area was 5% of the area where the separator and the electrode were to be laminated. Thereafter, succinonitrile was solidified into a wax phase at room temperature.

Then, a positive electrode was placed on one side of the separator, and a negative electrode was placed on the opposite side, and then laminated to manufacture an electrode assembly. At this time, the electrode assembly was roll-laminated at 80° C. and 1 kgf/cm. The prepared electrode assembly was accommodated in a pouch-type battery case, and an electrolyte solution was injected to manufacture a secondary battery.

Example 6

After the solid succinonitrile was heated to 60° C. to be liquefied, the liquefied succinonitrile was applied in the form of dots on both sides of the separator. At this time, the succinonitrile was applied so that the succinonitrile-applied area was 5% of the area where the separator and the electrode were to be laminated. Thereafter, succinonitrile was solidified into a wax phase at room temperature.

Then, a positive electrode was placed on one side of the separator, and a negative electrode was placed on the opposite side, and then laminated to manufacture an electrode assembly. At this time, the electrode assembly was roll-laminated at 80° C. and 10 kgf/cm. The prepared electrode assembly was accommodated in a pouch-type battery case, and an electrolyte solution was injected to manufacture a secondary battery.

Example 7

Solid succinonitrile was fixed in the form of dots on both sides of the separator so that the area of succinonitrile was 5% of the area where the separator and the electrode were to be laminated.

Thereafter, the separator was heated to 60° C. to liquefy succinonitrile. Then while cooling the succinonitrile at room temperature, positive and negative electrodes were placed on both sides of the separator, respectively, and then laminated to manufacture an electrode assembly. At this time, the electrode assembly was laminated at 80° C. and 30 kgf/cm.

The prepared electrode assembly was accommodated in a pouch-type battery case, and an electrolyte solution was injected to manufacture a secondary battery.

Comparative Example 1

After providing PVDF binder coating layers on both sides of the separator, an electrode assembly was manufactured by being interposed between the positive electrode and the negative electrode.

The electrode assembly was roll-laminated at 100° C. and 50 kgf/cm.

Thereafter, the battery was accommodated in a battery case, and an electrolyte solution was injected to manufacture a secondary battery.

Comparative Example 2

After the solid succinonitrile was heated to 60° C. to be liquefied, the liquefied succinonitrile was applied in the form of dots on both sides of the separator. At this time, the succinonitrile was applied so that the succinonitrile-applied area was 50% of the area where the separator and the electrode were to be laminated. Thereafter, succinonitrile was solidified into a wax phase at room temperature.

Then, a positive electrode was placed on one side of the separator, and a negative electrode was placed on the opposite side, and then laminated to manufacture an electrode assembly. At this time, the electrode assembly was roll-laminated at 80° C. and 5 kgf/cm.

The prepared electrode assembly was accommodated in a pouch-type battery case, and an electrolyte solution was injected to manufacture a secondary battery.

Comparative Example 3

After the solid succinonitrile was heated to 60° C. to be liquefied, the liquefied succinonitrile was applied in the form of dots on both sides of the separator. At this time, the succinonitrile was applied so that the succinonitrile-applied area was 5% of the area where the separator and the electrode were to be laminated. Thereafter, succinonitrile was solidified into a wax phase at room temperature.

Then, a positive electrode was placed on one side of the separator, and a negative electrode was placed on the opposite side, and then laminated to manufacture an electrode assembly. At this time, the electrode assembly was roll-laminated at 80° C. and 50 kgf/cm.

The prepared electrode assembly was accommodated in a pouch-type battery case, and an electrolyte solution was injected to manufacture a secondary battery.

Experimental Example: Cycle Characteristic Test

For the secondary batteries prepared according to Examples 1 to 7 and Comparative Examples 1 to 3, a change in charge/discharge characteristics was tested using a charge/discharge measuring device. The obtained battery had the first cycle discharge capacity and efficiency by 0.2 C charging and 0.2 C discharging, and Table 1 shows the capacity compared to the 0.2 C charge and 0.2 C discharge results by performing 0.2 C charging and 2.0 C discharging.

TABLE 1

| Division | $1^{st}$ cycle discharge capacity (mAh/g) | $1^{st}$ cycle Efficiency (%) | 2.0 C/0.2 C capacity Ratio (%) |
| --- | --- | --- | --- |
| Example 1 | 174.5 | 97.3 | 93.9 |
| Example 2 | 174.1 | 97.1 | 93.5 |
| Example 3 | 174.8 | 97.5 | 94.1 |
| Example 4 | 173.9 | 97.0 | 93.1 |
| Example 5 | 175.2 | 97.7 | 94.3 |
| Example 6 | 173.9 | 97.0 | 93.0 |
| Example 7 | 173.6 | 96.8 | 93.2 |
| Comparative Example 1 | 171.8 | 95.8 | 90.7 |
| Comparative Example 2 | 172.8 | 96.4 | 91.4 |
| Comparative Example 3 | 172.7 | 96.3 | 91.2 |

As shown in Table 1, in the battery manufactured according to the embodiment of the present invention, there is no significant difference in performance depending on the applied area and pressure of succinonitrile when evaluating the 2.0 C discharge. This is because succinonitrile does not significantly act as a resistance between the electrode and the separator during charging and discharging.

However, in Comparative Example 1, the PVDF binder layer partially melted between the electrode and the separator to act as a resistor in the battery, thereby increasing the battery resistance, thereby confirming a decrease in output. Also, in Comparative Examples 2 and 3, it was confirmed that the internal resistance increased as the output decreased.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

| [Description of reference numerals] | |
| --- | --- |
| 1: secondary battery, | 10: succinonitrile, |
| 20: binder coating layer, | 100: separator, |
| 200: first electrode, | 300: second electrode. |

The invention claimed is:

1. A method for manufacturing a secondary battery, comprising:
   preparing an electrode assembly in which succinonitrile is deposited alone on a separator or an electrode, thereby interposing the succinonitrile at an interface between the electrode and the separator;
   laminating by heating and pressing the prepared electrode assembly; and
   preparing the secondary battery by accommodating the laminated electrode assembly in a battery case and injecting an electrolyte solution.

2. The method of claim 1, wherein during the preparing the electrode assembly, the succinonitrile is partially interposed at the interface between the electrode and the separator.

3. The method of claim 1, wherein during the preparing the electrode assembly, an area to which the succinonitrile is applied is in a range of 1 to 30% of a total area of a portion where the electrode and the separator are laminated.

4. The method of claim 1, wherein the preparing the electrode assembly includes dropping succinonitrile on a surface of either the electrode or the separator.

5. The method of claim 4, wherein the preparing the electrode assembly includes:
   dropping liquid succinonitrile on one or both sides of the separator;
   cooling the succinonitrile to room temperature; and
   laminating the electrode on the separator with the succinonitrile interposed therebetween.

6. The method of claim 4, wherein the preparing the electrode assembly includes:
   dropping liquid succinonitrile on one or both sides of the electrode;
   cooling the succinonitrile to room temperature; and
   laminating the separator on the electrode with the succinonitrile interposed therebetween.

7. The method of claim 1, wherein the preparing the electrode assembly includes:
   applying succinonitrile in a wax phase to a surface of any one of the electrode or the separator.

8. The method of claim 7, wherein the preparing the electrode assembly includes:
   positioning the succinonitrile in a wax phase on one or both sides of the separator;
   heating the succinonitrile to a temperature equal to or higher than its melting point and cooling the succinonitrile to a room temperature; and
   laminating the electrode on the separator with the succinonitrile interposed therebetween.

9. The method of claim 7, wherein the preparing the electrode assembly includes:
   positioning the succinonitrile in a wax phase on one or both sides of the electrode;
   heating the succinonitrile to a temperature equal to or higher than its melting point and cooling the succinonitrile to a room temperature; and
   laminating a separator on the electrode with the succinonitrile interposed therebetween.

10. The method of claim 1, wherein the lamination is performed by pressing the electrode assembly at a temperature of 57° C. or higher.

11. The method of claim 1, wherein the lamination is performed by pressing the electrode assembly at a pressure of 30 kgf/cm or less.

12. The method of claim 1, wherein during the injecting the electrolyte solution or after the injecting the electrolyte solution, the succinonitrile is dissolved in the electrolyte solution.

* * * * *